United States Patent
Kaulio

(10) Patent No.: US 7,388,765 B2
(45) Date of Patent: Jun. 17, 2008

(54) METHOD AND ARRANGEMENT IN CONNECTION WITH A HALF-CONTROLLED NETWORK BRIDGE

(75) Inventor: Alpo Kaulio, Helsinki (FI)

(73) Assignee: ABB Oy, Helsinki (FI)

( * ) Notice: Subject to any disclaimer, the term of this patent is extended or adjusted under 35 U.S.C. 154(b) by 332 days.

(21) Appl. No.: 11/213,812

(22) Filed: Aug. 30, 2005

(65) Prior Publication Data

US 2006/0043412 A1 Mar. 2, 2006

(30) Foreign Application Priority Data

Aug. 30, 2004 (FI) .................................. 20045313

(51) Int. Cl.
*H02M 5/45* (2006.01)
*H02M 5/458* (2006.01)

(52) U.S. Cl. ............................ 363/37; 363/54; 363/57; 361/91.7; 361/97.8

(58) Field of Classification Search .................. 363/37, 363/35, 54, 57, 128; 361/91.7, 91.8
See application file for complete search history.

(56) References Cited

U.S. PATENT DOCUMENTS

| | | | | |
|---|---|---|---|---|
| 3,959,668 | A | * | 5/1976 | Ohhinata et al. ............ 327/450 |
| 4,039,864 | A | * | 8/1977 | Tokunaga et al. ............ 327/462 |
| 5,579,192 | A | * | 11/1996 | Lee ............................. 361/18 |
| 5,850,160 | A | | 12/1998 | Schnetzka et al. |
| 6,038,155 | A | | 3/2000 | Pelly et al. |
| 6,108,224 | A | | 8/2000 | Cao et al. |
| 6,594,130 | B2 | * | 7/2003 | Wagoner et al. ............ 361/91.7 |
| 6,819,012 | B1 | * | 11/2004 | Gabrys ......................... 307/68 |
| 2002/0044004 | A1 | | 4/2002 | Guido, Jr. et al. |
| 2003/0103305 | A1 | * | 6/2003 | Wagoner et al. ............ 361/91.7 |
| 2004/0090260 | A1 | | 5/2004 | Peron |

FOREIGN PATENT DOCUMENTS

EP     1 235 334 A2     8/2002
JP     1-308170     12/1989

OTHER PUBLICATIONS

Finnish Official Action.

\* cited by examiner

*Primary Examiner*—Bao Q. Vu
(74) *Attorney, Agent, or Firm*—Buchanan Ingersoll & Rooney PC

(57) ABSTRACT

A method and an arrangement for controlling phase-specific thyristors of a half-controlled network bridge, the method comprising identifying a thyristor to be controlled on the basis of the magnitude of phase voltage, controlling the thyristor by switching on a voltage in its gate current circuit to achieve a gate current. The controlling of the thyristor comprises the steps of leading the gate current through an inductive component of the gate current circuit to the gate of the thyristor, determining the magnitude of the gate current, alternately switching off the voltage in the gate current circuit, when the gate current is higher than a preset limit, and switching on the voltage in the gate current circuit, when the gate current is lower than a preset limit.

15 Claims, 2 Drawing Sheets

METHOD AND ARRANGEMENT IN CONNECTION WITH A HALF-CONTROLLED NETWORK BRIDGE

BACKGROUND OF THE INVENTION

The invention relates to a method and arrangement in connection with a half-controlled network bridge. More specifically, the invention relates to a method and arrangement for controlling thyristors of a half-controlled network bridge.

A network bridge is an electric converter for converting ac voltage of a network to dc voltage. A network bridge in its simplest form has six diodes, with two diodes connected in series for each network phase. These series-connected diodes are further connected in parallel with each other. Network phases are connected between the series-connected diodes, the anodes and cathodes of the parallel-connected pairs forming a positive and a negative terminal for dc voltage. This type of connection can be used for generating a 6-pulse voltage, the magnitude of which cannot be changed.

Half-controlled network bridges are commonly used in connection with frequency converters provided with intermediate DC circuits for generating the dc voltage of the intermediate circuit. The magnitude of the voltage generated by a half-controlled network bridge can be controlled by using controllable switches of the bridge. FIG. 1 illustrates an example of a half-controlled network bridge composed of three diodes and three thyristors. Each connected diode and thyristor form a series-connected pair in which the cathodes of the diodes are connected to the anodes of the thyristors. Further, all pairs thus connected are further connected in parallel and the network voltage phases are connectable between the series-connected components. A rectified voltage Udc is formed between the cathodes of the thyristors and the anodes of the diodes.

A thyristor is known to be a component that can be switched on to a conductive state by supplying gate current to the gate, when the thyristor voltage is forward-biased. However, a conventional thyristor cannot be switched off from the gate, but the thyristor remains conductive for as long as there is current passing through it. The operation of thyristors in connection with a network rectifier of a frequency converter is important for generating the desired intermediate circuit dc voltage. Therefore, to ensure that thyristors turn on, they are not supplied with just a single gate current pulse sufficient for turn-on, but receive continuous current feed for as long as turn-on is possible.

Prior art knows gate control achieved by connecting the gate to a voltage the gate current provided by which is restricted by using resistive coupling. To reduce power consumption, voltage is switched to the gate, thus producing pulsed gate current. A typical example of a prior art implementation is to produce pulsed gate current at a predetermined switching frequency. An example of this kind of constant switching frequency is 30 kHz, with a current amplitude of 0.5 A and pulse rate of about 55/45. Each cycle thus has 20 μs of current-carrying time and about 16 μs dead time. However, gate current generated this way involves considerable power consumption, because the magnitude of the current is restricted by a resistor.

In the prior art method the voltage to be connected, resistances in the gate current circuits, and voltage drops are used to determine the magnitude of current. Consequently, the magnitude of current may vary significantly due to variations in the supply voltage and in the gate-cathode voltage of the thyristor to be controlled. In the worst case, the current is not sufficient for turning on the thyristor as desired.

Moreover, continuous switching of the gate current circuit may cause problems relating to electromagnetic disturbances due to high switching-off rates of the gate current.

U.S. 2002/0044004 A1 proposes a solution in which continuous gate current is delivered to turn on a thyristor. However, the solution is complicated when used for controlling thyristors in a half-controlled thyristor bridge.

BRIEF DESCRIPTION OF THE INVENTION

It is an object of the invention to provide a method and arrangement that avoid the above drawbacks and enable thyristors of a half-controlled thyristor bridge to be controlled more reliably and with less loss than before. This is achieved by a method and arrangement of the invention characterized by what is stated in the independent claims. The preferred embodiments of the invention are disclosed in the dependent claims.

The invention is based on the idea of controlling thyristors of a half-controlled network bridge by means of a continuous gate current the magnitude of which is kept within certain limits by connecting the gate current circuit to a voltage on the basis of a simple measurement.

The method and arrangement of the invention provide gate current the magnitude of which can be precisely determined and thus made ideal for turning on a thyristor. In addition, the gate current is independent of any changes in the voltage to be connected. The gate current is taken through an inductive component, thereby restricting the rate of current rise.

BRIEF DESCRIPTION OF THE DRAWINGS

In the following the invention will be described in greater detail with reference to the preferred embodiments and the accompanying drawings, in which.

DETAILED DESCRIPTION OF THE INVENTION

Figure 2:
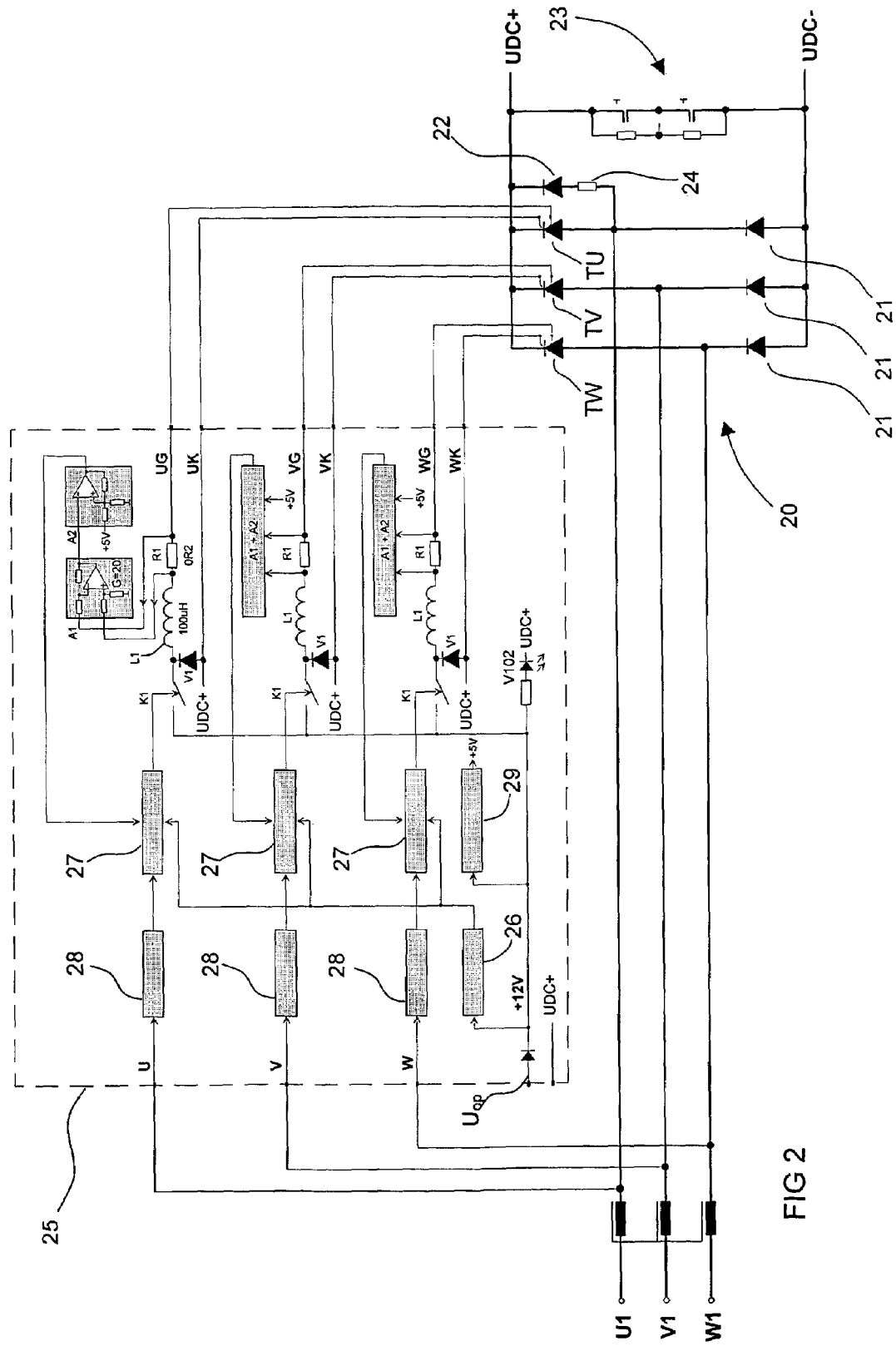
FIG. 2 is a block diagram of an arrangement of the invention.

FIG. 2 is schematic view of a three-phase half-controlled network bridge in connection with a frequency converter provided with an intermediate voltage circuit and a control circuit of the invention. The supply network voltage is to be connected to connectors U1, V1 and W1 and then rectified by means of a rectifier bridge 20 to provide a dc voltage to an intermediate dc voltage circuit UDC+, UDC−. The intermediate circuit is provided with capacitors 23, connected in a known manner, and rectifier resistors connected in parallel with them. FIG. 2 also shows an intermediate circuit charging diode 22 and a series resistor 24 thereof. A dead intermediate circuit is first charged with a phase U of network voltage through a circuit formed by the diode and the resistor.

The object of the arrangement and method of the invention is to control thyristors TW, TV, TU of the half-controlled network bridge to generate a voltage to an intermediate circuit. The thyristors are controlled by a control circuitry 25 whose inputs consist of phase voltages U, V, W, rectified voltage UDC+ and operating voltage $U_{op}$, the value of which is 12 V in the drawings. FIG. 2 also shows how the operating voltage is used to generate an auxiliary voltage of 5 volts by means of a regulator 29.

The thyristor control begins when the voltage in the intermediate circuit rises sufficiently close to its target value. The rising of voltage is determined outside FIG. 2, an achieved target value being indicated to the circuitry by connecting the operating voltage $U_{op}$ thereto. For visual indication of the operating voltage the circuitry is provided with a light emitting diode V102 and a series resistor thereof.

Once the operating voltage is connected to the circuitry, a turn-on block 26 transmits a signal enabling control to be carried out to control logics 27 of the different phases. The control logics 27 receive as inputs also phase voltage information from damping blocks 28. The damping blocks consist of resistances, for example, used for modifying a phase voltage signal so that the control logics can be used for selecting the thyristor to be controlled in each particular case. In other words, in each phase the control logic independently decides whether a thyristor associated with the phase in question can be controlled. The phase to be controlled may be selected for example by comparing the outputs of the damping blocks with a known voltage. When the damping block voltage exceeds a predetermined limit, the control of the thyristor of the phase associated with the damping block concerned begins and, correspondingly, ends when the voltage drops below the limit. The reference voltage may be common to all phases, for example, and generated by using an auxiliary voltage obtained from the regulator 29. The comparison between the phase voltage and the reference voltage may be implemented by means of a simple operational amplifier comparison.

FIG. 2 shows a three-phase network bridge and a control circuitry thereof, the control circuit of phase U being shown in greater detail than the other. However, it is apparent that in all phases the circuits producing gate current are implemented alike. For the sake of simplicity, the control circuit of phase U shown in more detail will be discussed in the following.

In accordance with the invention, a thyristor to be controlled is identified on the basis of the magnitude of the phase voltage as described above, for example. The thyristor to be controlled having been detected, it is controlled by switching on a voltage in its gate current circuit to produce gate current. As stated earlier, the control circuitry is supplied with an operating voltage $U_{op}$ connected in the embodiment of FIG. 2 to thyristor gate circuits to produce gate current. The operating voltage is switched on in the gate current circuit by means of controllable switches K1.

In the arrangement of the invention the operating voltage is determined with reference to the positive intermediate circuit voltage UDC+. This means that the zero potential of the operating voltage is voltage UDC+, i.e. the operating voltage floats on the positive intermediate circuit voltage.

The gate circuit of the arrangement of the invention comprises an inductive component and a resistive component, such as a resistor. In the method gate current is supplied to the thyristor gate through the inductive component, which slows down the rate of current change in a known manner. In the method of the invention the magnitude of the generated gate current is then determined and on the basis of its magnitude the voltage is alternately switched on and off in the gate current circuit.

When the gate current rises above a predetermined limit, voltage in the gate current circuit is switched off, whereby current starts to drop at a rate determined by the inductive component. When the current has dropped to a predetermined lower limit, voltage is again switched on in the gate circuit. The voltage remains switched on until the control logic 27 of the phase in question detects that the network voltage of the phase has dropped below a predetermined limit, whereby the thyristor of the phase is reverse-biased. As the control logic detects the drop in the phase voltage, the control of the switch in question and the production of gate current are stopped, and gate current control is applied to the thyristor detected to be forward-biased. In other words, gate current is not supplied to a reverse-biased thyristor, because in this situation current control would increase thyristor losses unnecessarily.

According to the arrangement and method of the invention, when the switch K1 is conducting, gate current passes from the operating voltage $U_{op}$ acting as the voltage source through an inductive component L1 and resistive component R1 to the gate of the thyristor to be controlled and further from an auxiliary cathode connected to the thyristor cathode, returning then to the zero potential of the operating voltage, i.e. to the positive intermediate circuit voltage UDC+. When the switch K1 is opened due to the current rising above a predetermined limit, current starts to flow to a diode V1 provided in the connection, the diode closing the current circuit as the current passes on through the inductive component, resistive component, thyristor gate and the auxiliary cathode of the thyristor.

The control circuitry of FIG. 2 comprises connecting points for the thyristor gates UG, VG, WG and auxiliary cathodes UK, VK, WK that connect the thyristors to the control circuitry.

In the arrangement of the invention gate current is measured using what is known as a shunt measurement, i.e. gate current is determined by determining the voltage loss caused by gate current over a resistive component connected to the current circuit. FIG. 2 shows the switching associated with phase U in greater detail. An operational amplifier connection A1 is connected over resistance R1. The operational amplifier connection forms a differential amplifier that provides a resistor to voltage loss, i.e. a voltage proportional to the current in the resistor, and amplifies this with an amplifier coefficient. This amplified voltage proportional to the current is further supplied to an operational amplifier circuit A2, which receives an auxiliary voltage to its second input, the voltage being 5 volts in the embodiment of FIG. 2.

The operational amplifier circuit A2 forms a comparator connection by means of hysteresis. This connection compares the incoming output of circuit A1 with the reference voltage such that when the voltage proportional to the gate current rises above a predetermined limit, the state of the output of circuit A2 changes. Correspondingly, when the voltage proportional to the gate current drops below a predetermined lower limit, the state of the output of circuit A2 changes its direction. The hysteresis of the comparator connection is determined in a known manner by means of components connected to the operational amplifier.

The output of the operational amplifier circuit A2 controls, as described above, the controllable switch component K1 in response to the magnitude of the current in the gate current circuit. In FIG. 2 the output of the connection A2 is connected to the control logic circuit 27 controlling the switch K1. In practice the operational amplifier may control the controllable switch either directly or with amplification, without applying the control logic.

FIG. 2 shows, by way of example, electric values of components. The value given to the resistive component is 0.2 ohm and the inductance of the inductive component is 100 µH. For example in this case the 0.5 ampere current in the gate current circuit produces a voltage expressed in volts to the input of the differential amplifier A1.

The gate current measurement is set to the potential of the gate conductor in the circuit, because the three gate current circuits all have a common supply voltage, and the cathodes of the thyristors to be controlled are rigidly connected together. This common point is the reference point of the control electronics and all measurements are made against it. It would be easier to place the current measurement into the return conductor of the gate current circuit, if all the gate current circuits were provided with separate floating potentials. However, this would require a plural number of galvanic isolations, which would increase the costs of the solution.

Figure 1:
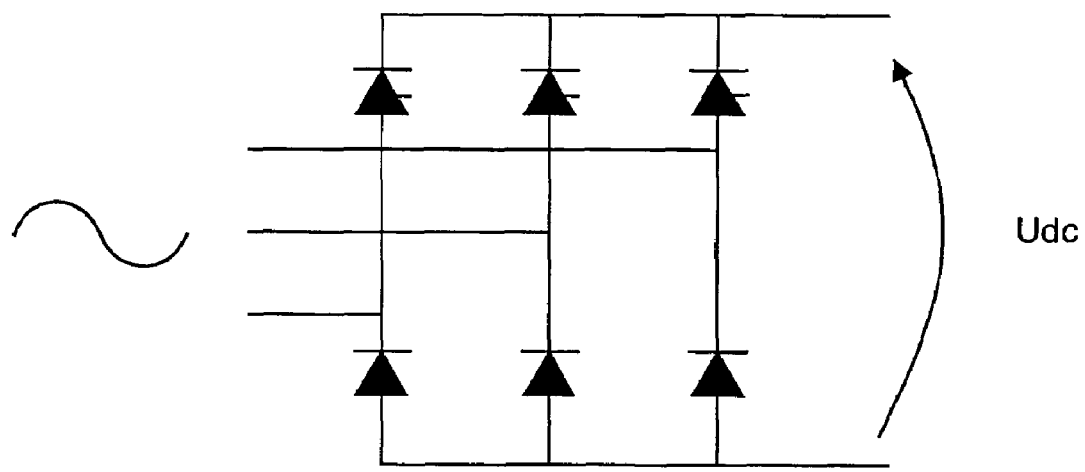
FIG. 1 shows a half-controlled network bridge.
Figure 3:
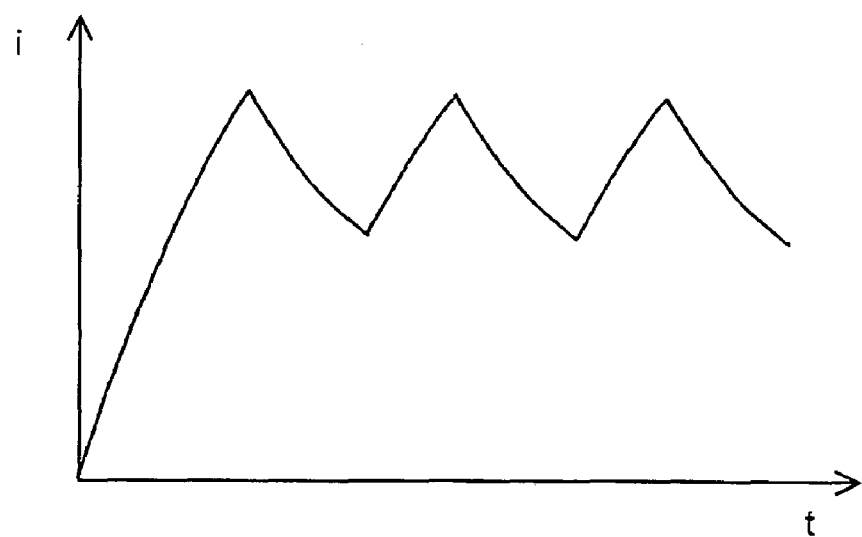
FIG. 3 shows a curve of the current provided by the invention.

The method and arrangement of the invention provide a continuous gate current of a specific waveform. FIG. 3 is a curve showing the form of the gate current obtained by means of the invention. The frequency of the curve form and the shape of the wave may be modified by means of the hysteresis resistor of the operational amplifier circuit acting as the comparator. When the method of the invention is being applied, a typical range of the switching frequency is about 10 to 40 kHz. The Figure shows the increase of the gate current from zero at the start of the thyristor control and the ensuing curve form for a few cycles.

It is apparent to a person skilled in the art that the basic idea of the invention can be implemented in various ways. The invention and its embodiments are therefore not restricted to the above examples, but may vary within the scope of the claims.

The invention claimed is:

1. A method for controlling phase-specific thyristors of a half-controlled network bridge, comprising
identifying a thyristor to be controlled on the basis of the magnitude of phase voltage;
controlling the thyristor by switching on the voltage in its gate current circuit to produce gate current, the thyristor control comprising the steps of:
controlling the gate current through an inductive component of the gate current circuit to the thyristor gate;
determining the magnitude of the gate current, and
alternately switching the voltage off from the gate current circuit, when the gate current is higher than a predetermined limit, and switching the voltage on in the gate current circuit, when the gate current is lower than a predetermined limit, wherein each thyristor is controlled by supplying voltage to each thyristor gate from a voltage source common to all the gate current circuits and wherein the magnitude of the gate current of each thyristor is determined at the potential of the gate conductor.

2. A method according to claim 1, wherein the identification of the thyristor to be controlled comprises a step of
detecting that phase current rises so that it is possible to turn on the thyristor of the phase concerned.

3. A method according to claim 1, wherein the method also comprises the steps of
detecting that phase current drops so that the thyristor reverse-biased; and
ending the thyristor control in response to the drop in the phase voltage.

4. An arrangement for controlling phase-specific thyristors of a half-controlled network bridge, the arrangement comprising:
phase-specific thyristors of the network bridge and gate current circuits for controlling these;
a voltage source arranged to be coupled to the gate current circuits of the thyristors, the gate current circuits comprising:
an inductive component;
means for determining gate current magnitude; and
means for switching on voltage from the voltage source to the gate current circuit in response to the magnitude of the gate current, wherein the voltage source is common to all gate current circuits and wherein the means for determining the magnitude of the gate current is at the potential of the gate conductor.

5. An arrangement according to claim 4, wherein the means for determining the magnitude of gate current comprise a resistive component arranged to the gate current circuit and a member determining voltage acting across the resistive component.

6. An arrangement according to claim 5, wherein the means for switching on the voltage from the voltage source comprises a comparator member responsive to the member determining the voltage acting across the resistive component and a controllable switch member responsive to the comparator member for switching on and off the voltage in the gate current circuit.

7. An arrangement according to claim 5, wherein the member determining the voltage acting across the resistive component is an operational amplifier switching acting as a differential amplifier.

8. An arrangement according to claim 6, wherein the comparator member is an operational amplifier switching acting as a comparator provided with hysteresis.

9. An arrangement according to claim 4, wherein the gate current circuit is also provided with a diode arranged to connect to the gate current circuit when the switch is in a blocking state.

10. An arrangement according to claim 6, wherein the member determining the voltage acting across the resistive component is an operational amplifier switching acting as a differential amplifier.

11. An arrangement according to claim 10, wherein the comparator member is an operational amplifier switching acting as a comparator provided with hysteresis.

12. An arrangement according to claim 5, wherein the gate current circuit is also provided with a diode arranged to connect to the gate current circuit when the switch is in a blocking state.

13. An arrangement according to claim 6, wherein the gate current circuit is also provided with a diode arranged to connect to the gate current circuit when the switch is in a blocking state.

14. An arrangement according to claim 7, wherein the gate current circuit is also provided with a diode arranged to connect to the gate current circuit when the switch is in a blocking state.

15. An arrangement according to claim 8, wherein the gate current circuit is also provided with a diode arranged to connect to the gate current circuit when the switch is in a blocking state.

* * * * *